US008826013B1

(12) United States Patent
Kodukula et al.

(10) Patent No.: US 8,826,013 B1
(45) Date of Patent: Sep. 2, 2014

(54) PROTECTION OF CUSTOMER DATA IN CLOUD VIRTUAL MACHINES USING A CENTRAL MANAGEMENT SERVER

(75) Inventors: Narasimham Kodukula, Sunnyvale, CA (US); Andrew John Dancer, Shenington (GB); Bharath Kumar Chandrasekhar, Santa Clara, CA (US)

(73) Assignee: Trend Micro Incorporated, Tokyo (JP)

(*) Notice: Subject to any disclaimer, the term of this patent is extended or adjusted under 35 U.S.C. 154(b) by 1149 days.

(21) Appl. No.: 12/565,561

(22) Filed: Sep. 23, 2009

(51) Int. Cl.
*G06F 21/00* (2013.01)

(52) U.S. Cl.
USPC ............. 713/165; 705/30; 380/279; 707/823; 726/1; 726/5

(58) Field of Classification Search
CPC .................................. G06F 21/44; G06F 21/62
USPC .......................................................... 713/165
See application file for complete search history.

(56) References Cited

U.S. PATENT DOCUMENTS

| | | | | |
|---|---|---|---|---|
| 5,991,399 | A | * | 11/1999 | Graunke et al. .............. 380/279 |
| 6,356,915 | B1 | * | 3/2002 | Chtchetkine et al. ......... 707/823 |
| 6,886,096 | B2 | | 4/2005 | Appenzeller et al. |
| 7,003,117 | B2 | | 2/2006 | Kacker et al. |
| 7,017,181 | B2 | | 3/2006 | Spies et al. |
| 7,103,911 | B2 | | 9/2006 | Spies et al. |
| 7,113,594 | B2 | | 9/2006 | Boneh et al. |
| 7,266,847 | B2 | | 9/2007 | Pauker et al. |
| 2004/0179684 | A1 | | 9/2004 | Appenzeller et al. |
| 2006/0080702 | A1 | * | 4/2006 | Diez et al. ........................ 725/30 |
| 2008/0134316 | A1 | | 6/2008 | Devonshire et al. |
| 2009/0328164 | A1 | * | 12/2009 | Sunder et al. ...................... 726/5 |
| 2010/0169948 | A1 | * | 7/2010 | Budko et al. ...................... 726/1 |

FOREIGN PATENT DOCUMENTS

| | | |
|---|---|---|
| GB | 2 434 947 A | 8/2007 |
| GB | 2 436 668 A | 10/2007 |
| GB | 2 436 910 A | 10/2007 |
| WO | 2007088337 A2 | 8/2007 |
| WO | 2007110598 A1 | 10/2007 |

OTHER PUBLICATIONS

Amazon Web Services Developer Community: S3 Encryption, posted on Jun. 10, 2009 (1 sheet).
Amazon Web Services: Introducing Amazon Virtual Private Cloud, 1 sheet [retrieved on Aug. 27, 2009], retrieved from the internet: http://aws.amazon.com/.

(Continued)

*Primary Examiner* — Carl Colin
*Assistant Examiner* — Syed Zaidi
(74) *Attorney, Agent, or Firm* — Okamoto & Benedicto LLP (57) ABSTRACT

A cloud computing environment includes a key management server and a cloud computer system running several virtual machines. A virtual machine hosted by the cloud computer system includes an integrity check module for checking the integrity of the virtual machine and getting identity information of the virtual machine. The integrity check module sends a key request to a key management server, which provides key service to different cloud computer systems. The key management server validates the request and, if the request is valid, provides the key to the virtual machine. The key is used to unlock an encrypted file system in the virtual machine.

20 Claims, 7 Drawing Sheets

(56) References Cited

OTHER PUBLICATIONS

Extern blog SensePost;—Blackhat presentation demo vids: Summary, Aug. 2009, 2 sheets.
Rational Survivability: The Big Four Cloud Computing Providers: Security Compared (Part I), Nov. 26, 2008, 3 sheets.
Cloud Computing, Cloud Hosting & Online Storage by Rackspace Hosting, 4 sheets [retrieved on Aug. 27, 2009], retrieved from the Internet: http://www.rackspacecloud.com/.
Saied Hosseini Khayat, "Using Communication Encryption to Share a Secret" Aug. 18, 2008, pp. 1-6, Electrical Engineering Dept., Ferdowsi University of Mashhad, Iran.

* cited by examiner

PROTECTION OF CUSTOMER DATA IN CLOUD VIRTUAL MACHINES USING A CENTRAL MANAGEMENT SERVER

BACKGROUND OF THE INVENTION

1. Field of the Invention

The present invention relates generally to computer security, and more particularly but not exclusively to cloud computing.

2. Description of the Background Art

Cloud computing allows a user to utilize services running on a remotely located computer rather than on the user's local computer. Typically, a cloud computer system includes one or more virtual machines running on a computer. A user may be allocated one of the virtual machines, which the user accesses over the Internet or another computer network. The user may run various applications on his virtual machine without having the same applications on his computer. Among its many advantages, cloud computing allows for ease of setup, expandability, and relatively low start up cost. It is thus no wonder that cloud computing services are commercially available from a growing number of companies, including Amazon Web Services™ and Rackspace US Inc.

The advantage of not having to set up a local infrastructure is also the main disadvantage of cloud computing. Because user data will be stored in the cloud rather than locally on the user's facilities, the user data is vulnerable to theft and other security issues. For example, the virtual machines may be stolen and run on another machine. Unless cloud providers implement a security solution that users can be comfortable with, users will be hesitant to store data in the cloud.

SUMMARY

A cloud computing environment includes a key management server and a cloud computer system running several virtual machines. A virtual machine hosted by the cloud computer system includes an integrity check module for checking the integrity of the virtual machine and getting identity information of the virtual machine. The integrity check module sends a key request to a key management server, which provides key service to different cloud computer systems. The key management server validates the request and, if the request is valid, provides the key to the virtual machine. The key is used to unlock an encrypted file system in the virtual machine.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
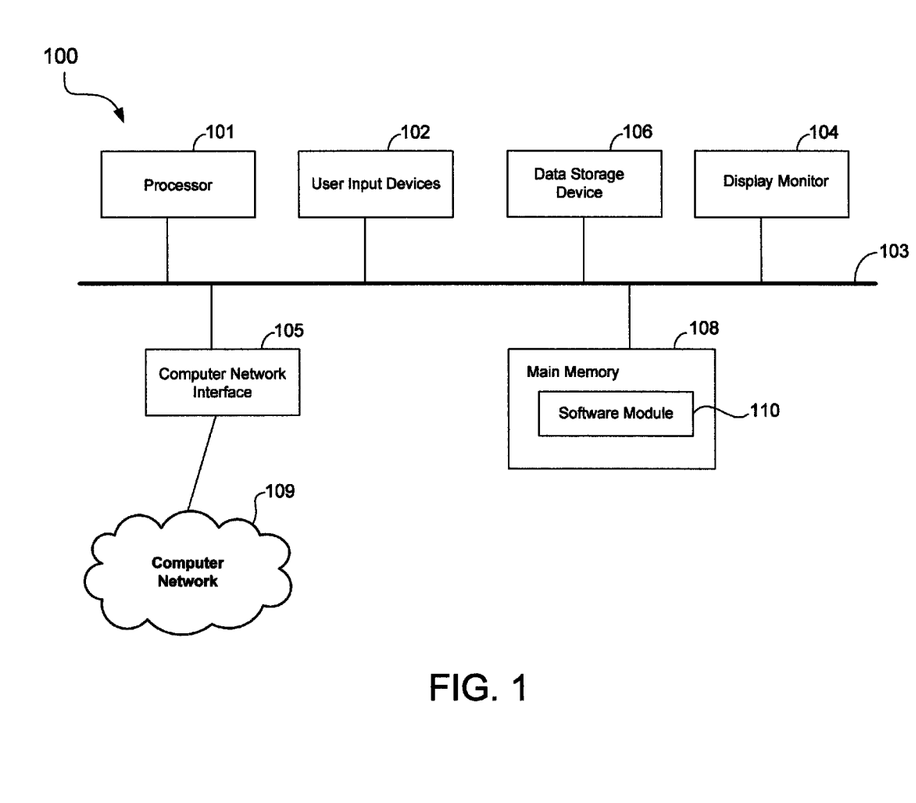
FIG. 1 shows a schematic diagram of a machine in the form of computer hardware in accordance with an embodiment of the present invention.

FIG. 1 shows a schematic diagram of a machine in the form of a computer hardware 100 ("computer 100") in accordance with an embodiment of the present invention. The computer 100 may be employed as a key management server or as a host computer for a virtual machine, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may be loaded from the data storage device 106 to the main memory 108 for execution by the processor 101. The software modules 110 may comprise software components of a cloud computing environment, including a key management server, a host computer for virtual machines, and customer computers, for example.

Figure 2:
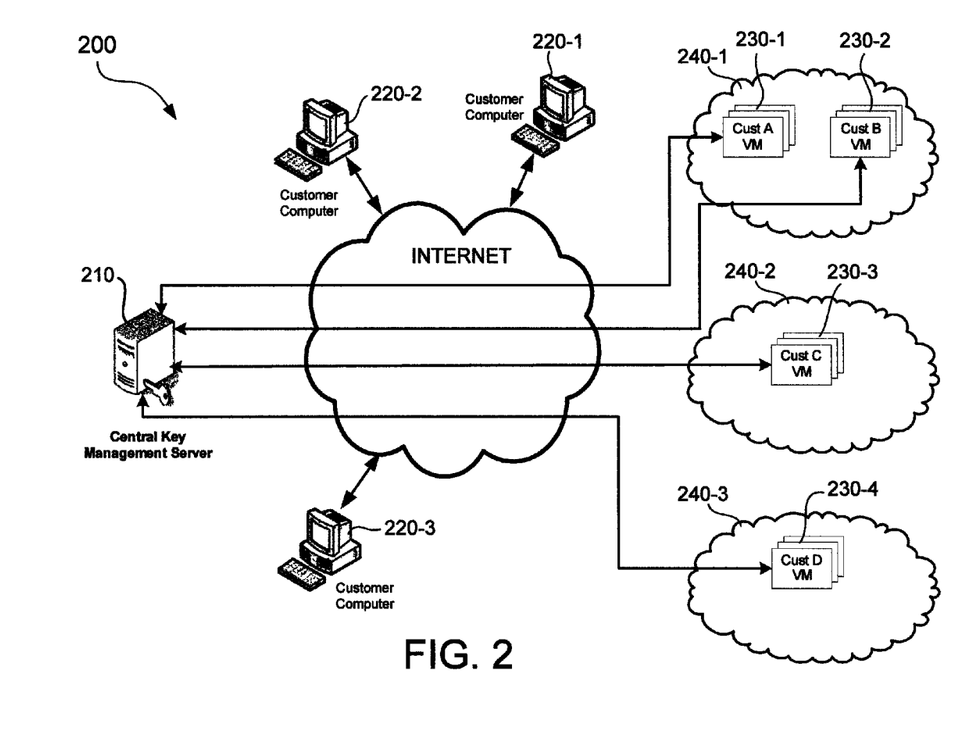
FIG. 2 schematically shows a cloud computing environment in accordance with an embodiment of the present invention.

Referring now to FIG. 2, there is schematically shown a cloud computing environment 200 in accordance with an embodiment of the present invention. The environment 200 includes a plurality of customer computers 220 (i.e., 220-1, 220-2, 220-3, . . . ), a plurality of cloud computer systems 240 (i.e., 240-1, 240-2, 240-3, . . . ), and one or more central key management server 210.

A cloud computer system 240 may comprise one or more computers configured (e.g., programmed) to run one or more virtual machines 230 (i.e., 230-1, 230-2, . . . ). Virtual machines in the art of computer science, in general, are well known. Briefly, a virtual machine is a software implementation of computer hardware and executes programs like a real machine. Virtualization allows several virtual machines to run on single computer hardware. For example, different customers may have separate virtual machines on the same single computer hardware. As another example, a single customer may have several virtual machines on the same single computer hardware. Each virtual machine is, in essence, a separate computer (albeit a virtual one) that has its own operating system, file system, and application programs that are separate from other virtual machines running on the same computer hardware. In the example of FIG. 2, the virtual machines 230 are hosted in computer hardware of a cloud computer system 240 of a commercial cloud computing service provider, such Amazon Web Services™ or Rackspace US Inc. For example, the cloud computer system 240-1 may be operated by Amazon Web Services™ the cloud computer system 240-2 may be operated by Rackspace US Inc., the cloud computer system 240-3 may be operated by yet another cloud computing service provider, and so on. A virtual machine may be employed as a web server, as an employee computer (e.g., as a replacement for an employee's desktop computer), and other computer applications.

A customer computer 220 comprises a computer employed by a user to remotely access a virtual machine 230 over a computer network, which in this example includes the Internet. Because the customer computer 220 and the cloud computer systems 240 are not owned and maintained by the same entity, it is critical to have a dependable security measure for protecting user data in the virtual machine 230. Otherwise, the user will not feel comfortable using the virtual machine 230 to process and store confidential data. A particular security concern is theft of a virtual machine 230. A virtual machine may be copied to computer-readable storage medium (or transferred over a computer network) and executed in another computer. This is relatively easy to perpetuate compared to theft of computer hardware because there are no bulky structures to carry out of the premises.

A central key management server 210 may comprise a computer configured (e.g., programmed) to store and provide keys for unlocking secured data in virtual machines 230. In the example of FIG. 2, the central key management server 210 stores and provides keys for unlocking encrypted file systems containing confidential customer data in cloud computer systems 240. Preferably, one central key management server 210 provides this key service to virtual machines 230 across differently owned and operated cloud computer systems 240. As can be appreciated, the central key management server 210 does not necessarily have to provide services to different customers. For example, as later explained with reference to FIG. 7, the central key management server 210 may be operated within an enterprise system of a customer. In one embodiment, the central key management server 210 is configured to receive a key request from a virtual machine 230, check the validity of the key request, and provide the requested key to the virtual machine if the request is valid. Otherwise, the central key management server 210 is configured not to provide the requested key.

Figure 3:
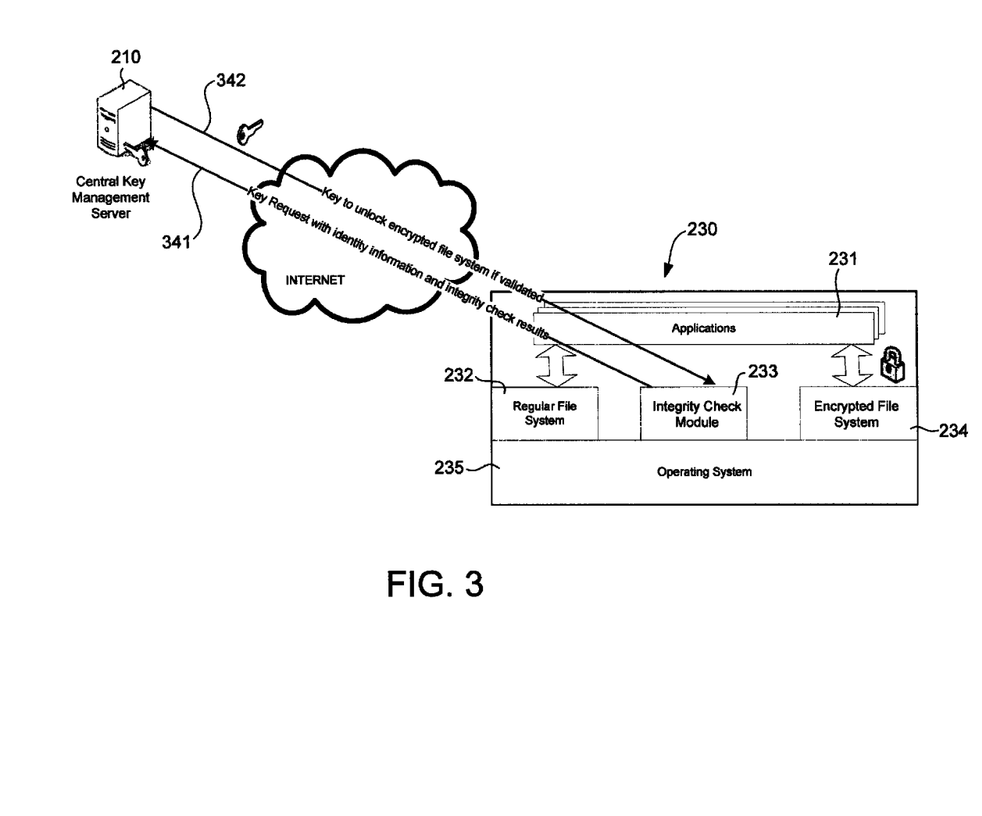
FIG. 3 schematically shows components of a virtual machine in accordance with an embodiment of the present invention.

FIG. 3 schematically shows the components of a virtual machine 230 in accordance with an embodiment of the present invention. In the example of FIG. 3, a virtual machine 230 comprises one or more applications 231, a regular file system 232, an integrity check module 233, an encrypted file system 234, and an operating system 235. The operating system 235 is also referred to as a "guest operating system" to distinguish it from the host operating system of the host computer on which the virtual machine 230 runs. The regular file system 232 comprises a conventional file system, such as those generally employed by operating systems to store and access files. In contrast, as its name implies, the encrypted file system 234 comprises a file system that is locked by encryption. Users may store confidential data in the encrypted file system 234 rather than in the regular file system 232. The encrypted file system 234 may be separate from the host operating system hosting the virtual machine 230. Using the Amazon Web Services as an example, the encrypted file system 230 may be a portion of an Elastic Storage Block ("ESB") encrypted by the customer. This prevents Amazon Web Services™ from accessing information stored in the ESB.

Computer files stored in the encrypted file system 234 cannot be accessed without an appropriate key for unlocking the encrypted file system 234. For example, an application 231 or the operating system 235 cannot access files in the encrypted file system 234 without the corresponding key of the encrypted file system 234. In one embodiment, one or more keys needed to unlock the encrypted file system 234 are not stored in the cloud computer system 240. Instead, the one or more keys needed to unlock the encrypted file system 234 are remotely located in the central key management server 210. This way, theft of the virtual machine 230 does not necessarily compromise the contents of the encrypted file system 234. The person who stole the virtual machine 230 would also need the key to access and open the files stored in the encrypted file system 234. But because the key is stored in the central key management server 210 rather than in the cloud, gaining access to confidential information in the encrypted file system 234 would require more than just stealing the virtual machine 230 from the cloud. Furthermore, the encrypted file system 234 limits the cloud computing service provider's access to customer confidential data in the encrypted file system 234, while still allowing the cloud computing service provider access to the operating system 234 and regular file system 232 to provide its service.

The integrity check module 233 may comprise computer-readable program code for checking the integrity of the virtual machine 230 and for obtaining the key for the encrypted file system 234 if the virtual machine 230 passes the integrity check. The integrity check module 233 may be configured to perform an integrity check by verifying that the virtual machine 230 has appropriate security posture. For example, the integrity check module 233 may check to ensure that the virtual machine 230 has updated patches for its applications 230 and operating system 235, a current version and enabled security software (e.g., antivirus, personal firewall), etc, prior to requesting the key from the central key management server 210. Another integrity check that the integrity check module 233 may perform is to verify the geographic location of the computer hosting the virtual machine 230. For example, if the virtual machine 230 is not in its predetermined expected geographic location, the integrity check module 233 may deem the virtual machine 230 to be running on a different computer, and therefore does not request the key from the central key management server 210. The geographic location of the virtual machine 230 may be determined from its Internet Protocol (IP) address, for example.

The integrity check module 233 may also be configured to provide virtual machine identity information to the central key management server 210. The virtual machine identity information may be included in the key request sent by the integrity check module 233 to the central key management server 210. Before providing the key, the central key management server 210 may use the virtual machine identity information to verify that the virtual machine 230 is in a valid state, such as whether or not the virtual machine 230 is running on its expected cloud computer system 240. The virtual machine identity information may include the virtual machine's IP address, machine name (e.g., unique identification provided by the cloud provider), geographic location, and/or other identifying information that can be used to verify that the virtual machine 230 is running on its expected cloud computer system 240.

The integrity check module 233 may be configured to perform its integrity checks when the virtual machine 230 boots up and initializes from a reset state (e.g., from a power down, restart, etc.). When the virtual machine 230 passes the integrity checks, the integrity check module 233 may request the central key management server 210 for the key (or keys) to unlock the encrypted file system 234 (see arrow 341). The key request to the central key management server 210 may include the results of the integrity checks and identity information of the virtual machine 230. To verity that the virtual machine 230 is still running on its cloud computer system 240, the central key management server 210 may compare the identity information included in the key request against the identity information registered for the virtual machine 230. The central key management server 210 may check the results of the integrity checks to determine the security posture of the virtual machine 230. If the security posture of the virtual machine 230 is compliant (e.g., has the latest patches and updates for its operating system 235, applications 233, and/or security software) and the virtual machine 230 is in a valid state (e.g., running on its cloud computer system 240 based on the identity information), the central key management server 210 provides the virtual machine 230 the key for unlocking the encrypted file system 234 (see arrow 342). The key may be used to unlock the encrypted file system 234 directly or indirectly (e.g., allows access to one or more additional keys for unlocking the encrypted file system 234).

Figure 4:
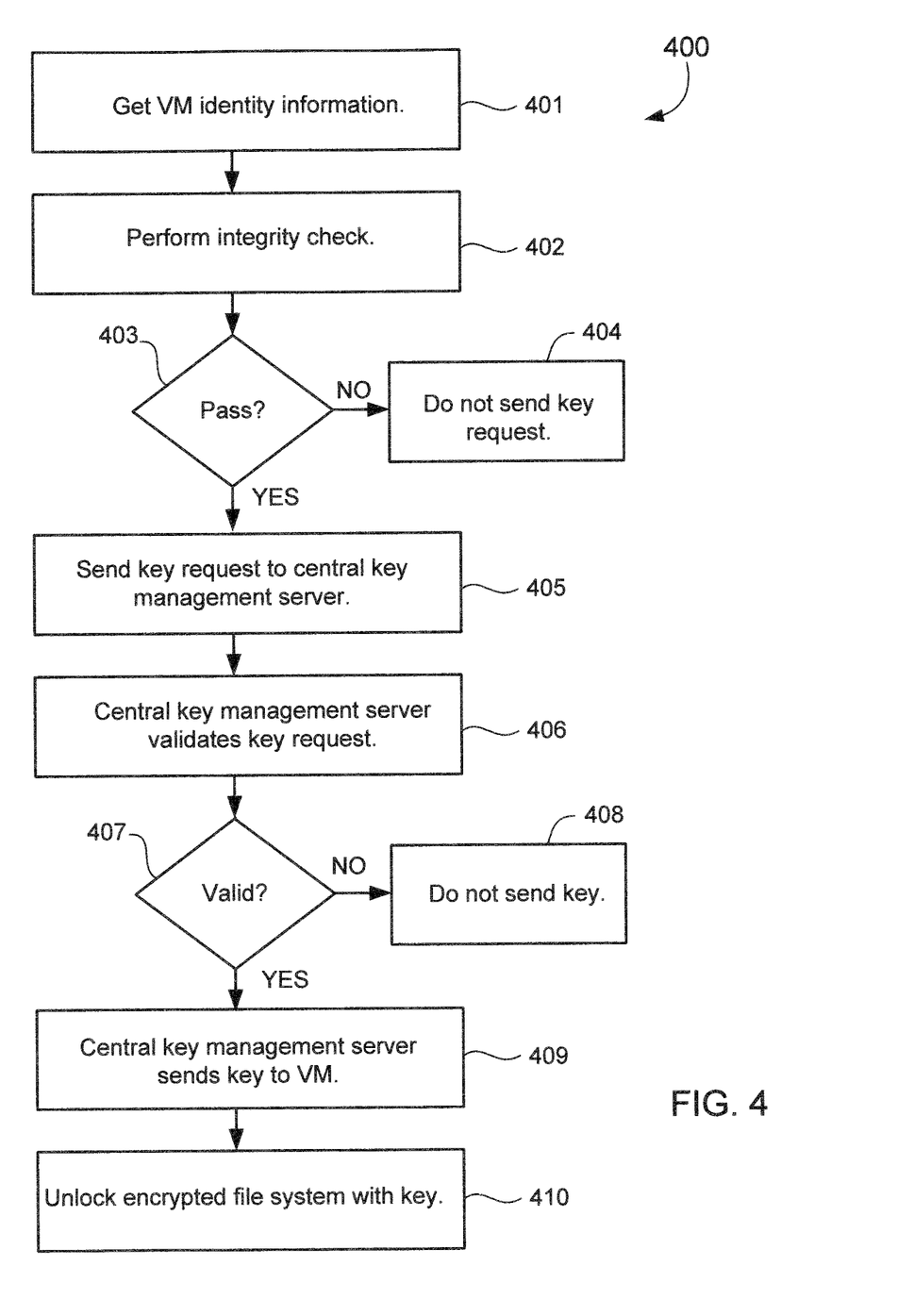
FIG. 4 shows a flow diagram of a method of protecting customer data in cloud virtual machines in accordance with an embodiment of the present invention.

FIG. 4 shows a flow diagram of a method 400 of protecting customer data in cloud virtual machines in accordance with an embodiment of the present invention. The method 400 may be implemented by appropriate programming of a computer, which in this example is a cloud computer system 240 for steps 401-405, and 410, and the central key management server 210 for steps 406-409.

The method 400 may begin when a virtual machine 230 hosted by a cloud computer system 240 is initialized from a reset state, such as when the virtual machine 230 boots up but before the virtual machine 230 is fully operational to provide its intended service (e.g., the virtual machine 230 is available to service HTTP requests if the virtual machine 230 is configured as a web server). The integrity check module 233 executing on the virtual machine 230 gets the identity information of the virtual machine 230 (step 401). For example, the integrity check module 233 may get the IP address and machine name of the virtual machine 230. The integrity check module 233 may perform an integrity check of the virtual machine 230. For example, the integrity check module 233 may check if the operating system 235 and security software of the virtual machine 230 are current with the latest updates and patches. As a particular example, the integrity check module 233 may check that antivirus software of the virtual machine 230 is a current version. This ensures that the virtual machine 230 has the correct security posture and is relatively secure.

If the virtual machine 230 passes the integrity check, the integrity check module 233 sends a key request to the central key management server 210 (step 403 to step 405). Otherwise, the integrity check module 233 does not send the key request (step 403 to step 404).

The key request may include the results of the integrity check and the identity information of the virtual machine 230. The central key management server 210 validates the key request prior to providing the key (or keys) to unlock the corresponding encrypted file system 234 (step 406). The central key management server 210 may validate the key request by comparing the identity information included in the key request against identity information registered for the virtual machine 230. For example, the customer using the virtual machine 230 may register the virtual machine 230 with the central key management server 210. The registration process may include providing the identity information of the virtual machine 230 to the central key management server 210. The central key management server 210 may further validate the key request by checking the results of the integrity check to ensure that the virtual machine 230 has the proper security posture. Preferably, the central key management server 210 and the integrity check module 233 are provided by the same computer security provider, such as Trend Micro Inc. This advantageously allows for a seamless registration and key management process.

To safeguard against man-in-the middle attacks and other online security threats, communication between the key management server 210 and the virtual machines 230 are preferably encrypted and/or include use of digital signatures. For example, the central key management server 210 may include verification of the digital signature of the key request to determine whether or not the key request is valid.

If the key request is valid, the central key management server 210 provides the requested key (or keys) for unlocking the encrypted file system 234 to the virtual machine 230 (step 407 to step 409). The central key management server 210 may identify the correct key from the virtual machine identity information. Otherwise, if the key request is not valid, the central key management server 210 does not send the key (step 407 to step 408). As can be appreciated, the key may be for directly unlocking the encrypted file system 234, or for getting another key (or a series of layered keys) that unlocks the encrypted file system 234.

The integrity check module 233 uses the key received from the central key management server 210 to unlock the encrypted file system 234 (step 410). For example, the integrity check module 233 may use the key to generally unlock the encrypted file system 234 for general access by the operating system 235 and any application 231.

Alternatively, the integrity check module 233 may use the key to unlock the encrypted file system 234 only for particular, authorized applications 231. For example, applications 231 that are trusted to access files in the encrypted file system 234 may be identified in a secured list or data structure accessible only to the integrity check module 233. To access an encrypted file in the encrypted file system 234, a trusted application 231 may request the integrity check module 233 for the key. The integrity check module 233 may verify that the application 231 requesting for the key is indeed trusted. If so, the integrity check module 233 provides the key to the trusted application 231, which then uses the key to access and decrypt the encrypted file from the encrypted file system 234. Otherwise, if the application 231 is not a trusted application, the integrity check module 233 does not provide the key to the application 231. This advantageously prevents malicious codes from gaining access to confidential customer data in the encrypted file system 234.

The central key management server 210 may log particulars of key request transactions. The log may include which virtual machine 230 requested and/or received which key at what time. This allows the central key management server 210 to perform tasks other than key storage and gatekeeping. For example, the central key management server 210 may be employed to provide audit logs, access control violation summary, machine usage statistics, internal error logs, etc., expanding the role of the central key management server 210 to include wider systems management role.

Figure 5:
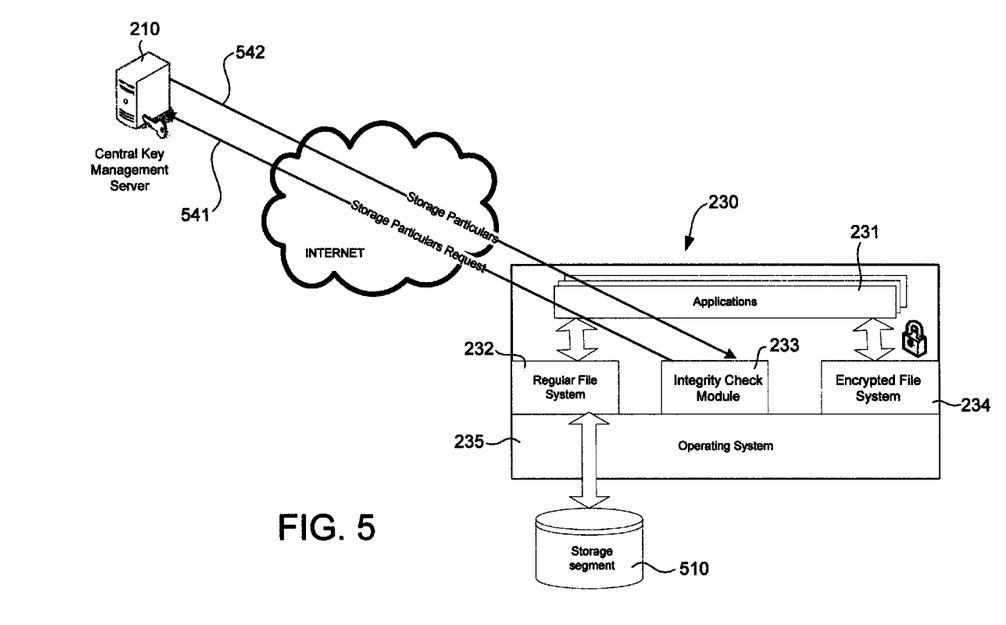
FIG. 5 schematically illustrates a configuration where a key management server is employed to provide particulars for mounting a storage segment in accordance with an embodiment of the present invention.

The central key management server 210 may also be employed in applications where the particulars of a storage segment to be processed are provided by a central authority to a virtual machine after a validation process. This is illustrated in FIG. 5, where the central key management server 210 acts as the central authority and is further configured to store particulars for mounting a storage segment 510. The storage segment 510 may be a segment of a computer-readable storage medium, such as a hard disk. The storage segment 510 is not necessarily part of the computer hosting the virtual machine 230, but may also be on computer-readable storage medium accessible over a public computer network, such as the Internet. In the example of FIG. 5, the storage segment 510 is schematically shown as being mountable to the regular file system 232. As can be appreciated, the storage segment 510 may also have encrypted files and be mountable to the encrypted file system 234.

As shown in FIG. 5, the integrity check module 233 may be further configured to request the central key management server 210 for the particulars of the storage segment 510 (arrow 541). The storage segment particulars may include which storage segment to mount, which applications to grant access to the storage segment, etc.

As before, the request for storage segment particulars may include the results of an integrity check performed by the integrity check module 233 and virtual machine identity information. If the request is valid, the central key management server 210 may provide the particulars of the storage segment to the integrity check module 233 (arrow 542), which then mounts the storage segment 510 for access by all or only authorized applications 231. The embodiment of FIG. 5 is advantageous in scenarios where the storage segment provider needs to be separated from the processing provider (i.e., provider of the virtual machine 230). For example, the storage segment 510 may be in a computer-readable storage medium accessible over the Internet, and provided by an in the cloud storage provider different from the in the cloud processing provider. The just-described technique for mounting a storage segment may be used on its own or in addition to the technique for requesting and receiving a key for an encrypted file system.

Figure 6:
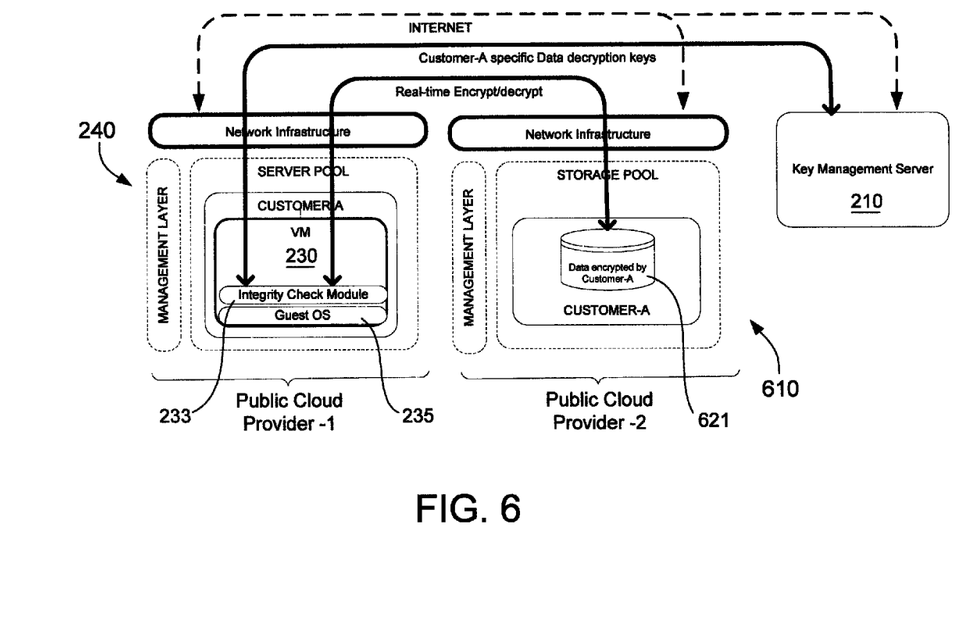
FIG. 6 schematically illustrates a configuration where one cloud provider provides processing in the cloud, while another separate cloud provider provides storage in the cloud in accordance with an embodiment of the present invention.

FIG. 6 schematically shows a configuration where one cloud provider provides processing in the cloud, while another separate cloud provider provides storage in the cloud in accordance with an embodiment of the present invention. In the example of FIG. 6, a public cloud provider-1 provides the cloud computer system 240 for in the cloud processsing, and a separate public cloud provider-2 provides a cloud storage system 610 for in the cloud storage. Both of the public cloud providers include network infrastructure and management layer for providing services over the Internet. In the example of FIG. 6, a Customer A leases a virtual machine 230, which runs on a computer server pool (i.e., one or more server computers) in the cloud computer system 240 of the public cloud provider-1. The virtual machine 230 includes its operating system 235 and integrity check module 235.

In the example of FIG. 6, the Customer A leases a storage portion 621, which comprises storage area on a storage pool (i.e., one or more data storage devices) of the cloud storage system 610. The storage portion 621 is encrypted by the Customer A, and the key (or keys) for unlocking the storage portion 621 is maintained in the key management server 210. The key management server 210, the cloud computer system 240 and the cloud storage system 610 comprise separate computers that communicate over a computer network, which in this example is the Internet. The integrity check module 233 may request the key from the key management server 210, which validates the key request before providing the key to the integrity check module 233. The integrity check module 233 may use the key to unlock and access the encrypted storage portion 621 on the cloud storage system 610.

Figure 7:
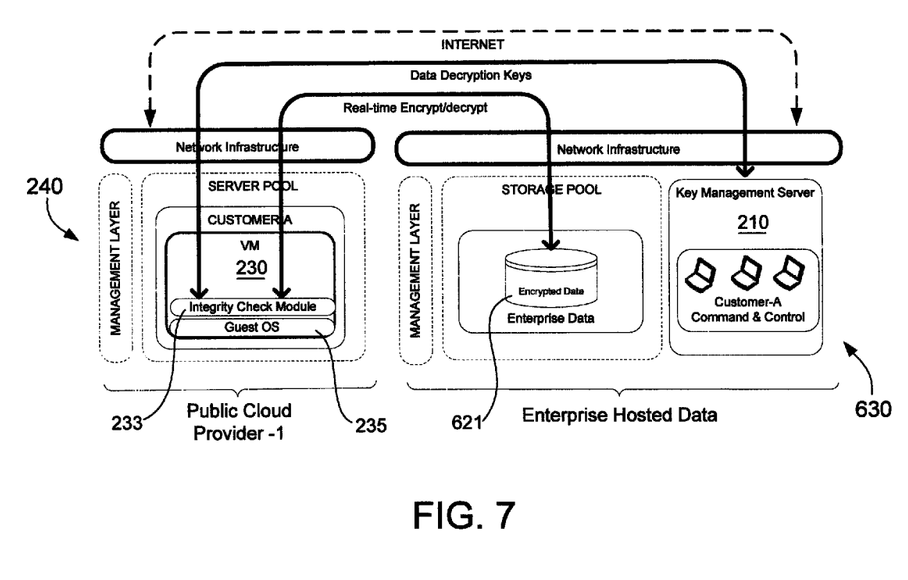
FIG. 7 schematically illustrates a configuration where a cloud provider provides processing in the cloud, while data storage remains within the customer's own private computer network in accordance with an embodiment of the present invention.

FIG. 7 schematically shows a configuration where a cloud provider provides processing in the cloud, while storage remains within the customer's own private computer network in accordance with an embodiment of the present invention. In the example of FIG. 7, the public cloud provider-1 provides the cloud computer system 240 for in the cloud processsing, and the customer's enterprise system 630 provides data storage. Both the public cloud provider-1 and the enterprise system 630 include network infrastructure and management layer for providing services over the Internet. The enterprise system 630 comprises a plurality of computers for providing company wide services, which in this example include data storage accessible over a computer network.

In the example of FIG. 7, the Customer A leases a virtual machine 230, which runs on a computer server pool in the cloud computer system 240 of the public cloud provider-1. The virtual machine 230 includes its operating system 235 and integrity check module 233. The Customer A's enterprise system 630 includes a storage pool comprising one or more data storage devices. A storage portion 621 on the storage pool is encrypted by the Customer A, and the key (or keys) for unlocking the storage portion 621 is maintained in the key management server 210. The key management server 210 and the storage pool are part of the enterprise system 630 within the same private computer network. The cloud computer system 240 communicates with computers on the enterprise system 630 over the Internet. As before, the integrity check module 233 may request the key from the key management server 210, which validates the key request before providing the key to the integrity check module 233. The integrity check module 233 may use the key to unlock and access the encrypted storage portion 621.

Techniques for protecting customer data in cloud virtual machines have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method to be performed by a computer programmed to protect data in a cloud computer system, the method comprising:

getting virtual machine identity information identifying a virtual machine hosted and running on a computer system providing a cloud computing service;

performing an integrity check on the virtual machine to determine a security posture of the virtual machine;

sending a key request over the Internet from a program module running under an operating system that is operating in the virtual machine to a key management server, the key request being for a key to unlock an encrypted file system in the virtual machine, the key management server being remotely located from the computer system and configured to provide keys to file systems in other computer systems providing cloud computing services;

receiving the key from the key management server when the key management server deems the key request to be valid, the key being received in the virtual machine; and using the key to unlock the encrypted file system.

2. The method of claim 1 wherein the security posture comprises a version of an antivirus on the virtual machine.

3. The method of claim 1 wherein the security posture comprises a patch status of an operating system of the virtual machine.

4. The method of claim 1 wherein the virtual machine identity information comprises an IP (Internet Protocol) address of the virtual machine.

5. The method of claim 1 wherein using the key to unlock the encrypted file system comprises:

unlocking the encrypted file system for use by any application running under the operating system in the virtual machine.

6. The method of claim 1 wherein using the key to unlock the encrypted file system comprises:

unlocking the encrypted file system for use only by particular applications running under the operating system in the virtual machine.

7. The method of claim 1 further comprising:

receiving from the key management server particulars for mounting a storage segment on the virtual machine; and using the particulars to mount the storage segment for access in the virtual machine.

8. A system for protecting confidential data in a cloud computing environment, the system comprising:

a cloud computer system programmed to run an integrity check module in a virtual machine in a plurality of virtual machines, the integrity check module being configured to perform an integrity check on the virtual machine and to request a key for unlocking an encrypted file system in the virtual machine after the virtual machine passes the integrity check, the integrity check module running under an operating system that operates in the virtual machine; and a key management server programmed to receive the request for the key and to provide the key to the virtual machine when the key management server validates the request for the key, the key management server being configured to receive key requests for unlocking encrypted file systems on different virtual machines hosted by different cloud computer systems.

9. The system of claim 8 wherein the integrity check module is configured to perform the integrity check by checking a version of an antivirus on the virtual machine.

10. The system of claim 8 wherein the integrity check module is configured to perform the integrity check by checking patch status of an operating system of the virtual machine.

11. The system of claim 8 wherein the key management server validates the request for the key by determining whether or not the virtual machine is hosted on a predetermined computer.

12. The system of claim 8 wherein the key management server validates the request for the key by checking the IP address of the virtual machine.

13. The system of claim 8 wherein the integrity check module is configured to use the key to unlock the encrypted file system for any application running on the virtual machine.

14. The system of claim 8 wherein the integrity check module is configured to use the key to unlock the encrypted file system only for particular, authorized applications running under the operating system running in the virtual machine.

15. A method to be performed by a computer programmed to protect data in a cloud computer system, the method comprising:

receiving over a computer network a key request from a program module running under an operating system that operates in a virtual machine hosted by a remotely located computer, the key request including identity information identifying the virtual machine and a result of an integrity check performed on the virtual machine;

checking the identity information and the result of the integrity check to validate the request; and providing the virtual machine access information for accessing data in the virtual machine when the request is valid.

16. The method of claim 15 wherein the access information comprises particulars for mounting a storage segment in the virtual machine.

17. The method of claim 16 wherein the storage segment is mountable on a regular file system of the virtual machine.

18. The method of claim 15 wherein the access information comprises a key for unlocking an encrypted file system in the virtual machine.

19. The method of claim 15 wherein the identity information comprises an IP address of the virtual machine.

20. The method of claim 15 wherein the result of the integrity check indicates whether an antivirus of the virtual machine is current.

* * * * *